United States Patent
Chen et al.

(10) Patent No.: US 9,201,542 B2
(45) Date of Patent: Dec. 1, 2015

(54) LIGHT SENSITIVE DISPLAY APPARATUS AND OPERATING METHOD THEREOF

(75) Inventors: Wei-Tsung Chen, Hsinchu (TW); Ted-Hong Shinn, Hsinchu (TW); Wen-Chung Tang, Hsinchu (TW); Chih-Hsiang Yang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 70 days.

(21) Appl. No.: 13/615,790

(22) Filed: Sep. 14, 2012

(65) Prior Publication Data
US 2013/0187844 A1 Jul. 25, 2013

Related U.S. Application Data

(60) Provisional application No. 61/588,189, filed on Jan. 19, 2012.

(30) Foreign Application Priority Data

May 31, 2012 (TW) .............................. 101119573 A

(51) Int. Cl.
G09G 3/34 (2006.01)
G06F 3/042 (2006.01)
G09G 3/20 (2006.01)
G06F 3/0354 (2013.01)

(52) U.S. Cl.
CPC ............ *G06F 3/042* (2013.01); *G06F 3/03542* (2013.01); *G09G 3/20* (2013.01)

(58) Field of Classification Search
CPC .... G02F 1/167; G09G 3/344; G09G 2360/14; G09G 2360/141; G09G 2360/142; G06F 3/041; G06F 3/0325
USPC .................................................. 345/107, 173
See application file for complete search history.

(56) References Cited

U.S. PATENT DOCUMENTS 7,009,663 B2 3/2006 Abileah et al.
7,053,967 B2 5/2006 Abileah et al.
(Continued)

FOREIGN PATENT DOCUMENTS

TW 200935377 A 8/2009

OTHER PUBLICATIONS

Murph, Darren. "Toshiba Write-Erasable Input Display hands-on at SID 2011 (video)." May 18, 2011. Online video clip. engadget.com. Accessed on Feb. 20, 2014. Retrieved from: <http://wayback.archive.org/web/20110519204331/http://www.engadget.com/2011/05/18/toshiba-write-erasable-input-display-hands-on-at-sid-2011-video/>.*

(Continued)

*Primary Examiner* — Kent Chang
*Assistant Examiner* — Mark Edwards
(74) *Attorney, Agent, or Firm* — CKC & Partners Co., Ltd.

(57) ABSTRACT

A light sensitive display apparatus and an operating method thereof are disclosed herein. The light sensitive display apparatus includes a plurality of pixels, and the operating method of the light sensitive display apparatus includes the following steps. In a writing state, a first data voltage and a first gate voltage are provided to the pixels, and the pixels illuminated by light rays are switched to or kept in a first display state. In an erasing state, a second data voltage and a second gate voltage are provided to the pixels, and the pixels illuminated by light rays are switched to or kept in a second display state.

11 Claims, 4 Drawing Sheets

(56) References Cited

U.S. PATENT DOCUMENTS

| | | | |
|---|---|---|---|
| 7,626,575 | B2 | 12/2009 | Cho et al. |
| 7,663,608 | B2 | 2/2010 | Sui et al. |
| 7,852,417 | B2 | 12/2010 | Abileah et al. |
| 7,872,641 | B2 | 1/2011 | Abileah et al. |
| 7,924,269 | B2 | 4/2011 | Chen et al. |
| 2006/0139334 | A1 | 6/2006 | Van Delden |
| 2007/0109239 | A1 | 5/2007 | den Boer |
| 2009/0002341 | A1 | 1/2009 | Saito |
| 2010/0155731 | A1 | 6/2010 | Sun et al. |
| 2010/0328275 | A1* | 12/2010 | Yamazaki ............... 345/204 |

OTHER PUBLICATIONS

Khashayar Ghaffarzadeh, Arokia Nathan, John Robertson, Sangwook Kim, Sanghun Jeon, Changjung Kim, U-In Chung, and Je-Hun Lee. "Persistent photoconductivity in Hf_In_Zn_O thin film transistor". published online Oct. 5, 2010. Applied Physics Letters 97, 143510 (2010); doi: 10.1063/1.3496029. (accessed Feb. 20, 2014).*

Ito, M., Kon, M., Miyazaki, C., Ikeda, N., Ishizaki, M., Matsubara, R., Ugajin, Y. and Sekine, N. (2008), Amorphous oxide TFT and their applications in electrophoretic displays. Published online Jul. 21, 2008. Phys. Status Solidi A, 205: 1885-1894. doi: 10.1002/pssa.200778910 (accessed Feb. 20, 2014).*

High-Performance Light-Erasable Memory and Real-Time Ultraviolet Detector Based on Unannealed Indium—Gallium—Zinc—Oxide Thin-Film Transistor(Wei-Tsung Chen and Hsiao-Wen Zan, IEEE Electron Device Letters, vol. 33, No. 1, Jan. 2012).

Corresponding TW Office Action that the art reference was sited.

* cited by examiner

LIGHT SENSITIVE DISPLAY APPARATUS AND OPERATING METHOD THEREOF

RELATED APPLICATIONS

This application claims priority to U.S. Provisional Application Ser. No. 61/588,189, filed Jan. 19, 2012, and Taiwan Application Serial Number 101119573, filed May 31, 2012, the disclosures of which are incorporated herein by reference in their entireties.

BACKGROUND

1. Field of Invention

The present invention relates to a display apparatus and an operating method thereof. More particularly, the present invention relates to a light sensitive display apparatus and an operating method thereof.

2. Description of Related Art

Along with the development of the electronic and display technology, multiple display apparatuses in different types are widely applied in various fields, including computers, mobile phones or flat-plate apparatuses. Display apparatuses (such as a touch panel) which have sensing capability and do not need a keyboard to input information are getting popular and become the main stream of consumer electronics.

Among traditional display apparatuses having sensing capability, the touch panel is most popular. However, the touch panel needs to detect touch points, which is interfered easily and positioning poorly. When the touch panel is applied to a display apparatus having a writing function, such as an electronic blackboard or an electronic paper apparatus, the touch panel cannot provide a contrast ratio as a traditional blackboards or an Electro-Phoretic Display paper; Furthermore, the touch panel cannot keep the picture permanently. In addition, if the touch panel displays for a long time, such as being used in the school, it might waste a lot of energy.

Therefore, there is a need for a new display apparatus having a writing function and a method thereof.

SUMMARY

According to one embodiment of the present invention, the light sensitive display apparatus includes a display panel, a plurality of data lines, a plurality of gate lines, a data driving circuit and a gate driving circuit. The display panel includes a plurality of pixels. The data lines are connected to the pixels. The gate lines are also connected to the pixels. The data driving circuit is connected to the data lines so as to provide a first data voltage to the pixels via the data lines in a writing state and to provide a second data voltage to the pixels via the data lines in an erasing state. The gate driving circuit is connected to the gate lines so as to provide a first gate voltage to the pixels via the gate lines in a writing state and to provide a second gate voltage to the pixels via the gate lines in an erasing state. In the writing state, pixels illuminated by light rays are switched to or kept in a first display state. In the erasing state, pixels illuminated by light rays are switched to or kept in a second display state.

Another aspect of the present invention provides an operating method of the light sensitive display apparatus. The light sensitive display apparatus includes a display panel including a plurality of pixels. The operating method includes the following steps.

In a writing state, a first data voltage and a first gate voltage are provided to the pixels, and the pixels illuminated by light rays are switched to or kept in a first display state.

In an erasing state, a second data voltage and a second gate voltage are provided to the pixels, and the pixels illuminated by light rays are switched to or kept in a second display state.

In conclusion, by applying the embodiments of the present invention, a light sensitive display apparatus is realized. The conduction state of the bi-stable metal oxide transistor is changed by being illuminated by light rays, so that the display unit switches the display state under illumination, and thus the action of writing or erasing with light rays is achieved. Furthermore, the display state of the pixels is changed when being illuminated by light rays, so as to avoid the disadvantages that the touch panel is easily interfered and poorly positioned. A bi-stable display panel is adopted as the display panel, so that the light sensitive display apparatus has the characteristics of realizing permanent keeping and being low in power consumption.

BRIEF DESCRIPTION OF THE DRAWINGS

In order to make the following as well as other aspects, features, advantages, and embodiments of the present invention more apparent, the accompanying drawings are described as follows.

DETAILED DESCRIPTION

The spirit of the present invention is clearly illustrated in the following embodiments with reference to the accompanying drawings. Those of skills in the technical art can make various modifications and variations to the technology taught in the present invention without departing from the scope or spirit of the present invention after understanding a preferred embodiment of the present invention.

If it is not specially indicated, "connection" used in the context refers to direct connection or indirect connection. That is, one end is connected to another end via a medium or not.

The phrases "a first source/drain electrode" and "a second source/drain electrode" used in the context refer to a source electrode or a drain electrode of a transistor. When "the first source/drain electrode" is the source electrode, the "second source/drain electrode" is the drain electrode. When "the first source/drain electrode" is the drain electrode, the "second source/drain electrode" is the source electrode.

An aspect of the present invention provides a light sensitive display apparatus. The light sensitive display apparatus can write or erase with light rays, and can be applied to display apparatuses having a writing function, such as an electronic blackboard or electronic paper apparatus.

Figure 1:
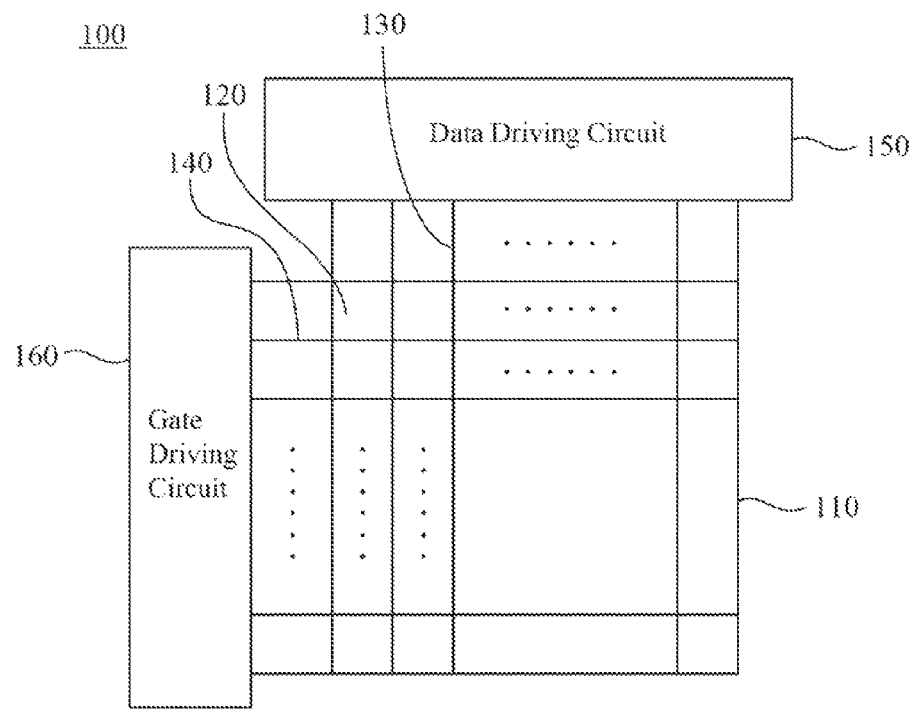
FIG. 1 illustrates a schematic view according to a light sensitive display apparatus in an embodiment of the present invention.

FIG. 1 illustrates a schematic view drawn according to a light sensitive display apparatus 100 in an embodiment of the present invention. As shown in FIG. 1, the light sensitive display apparatus 100 includes a display panel 110, a plurality of data lines 130, a plurality of gate lines 140, a data driving circuit 150 and a gate driving circuit 160. In this embodiment, the display panel 110 is but not limited to a bi-stable electrophoretic display panel.

In structure, the display panel 110 includes a plurality of pixels 120; the data lines 130 are connected to the pixels 120; the gate lines 140 are connected to the pixels 120; the data driving circuit 150 is connected to the data lines 130; and the gate driving circuit 160 is connected to the gate lines 140. It should be understood that the data driving circuit 150 and the gate driving circuit 160 can be realized by electronic elements and circuits, and also may be different electronic wafers respectively or be integrated as a single electronic wafer.

In operation, the data driving circuit 150 is used for providing first and second data voltages to the pixels 120. The gate driving circuit 160 is used for providing first and second gate voltages as well as voltage pulse waves to the pixels 120. Each of the pixels 120 has a first display state and a second display state. For example, black is displayed in the first display state, and white is displayed in the second display state. In addition, in another embodiment, the above first and second display states are shown in the manner of emitting light or not or in other display manners, and it is not limited to the above example.

Figure 2:
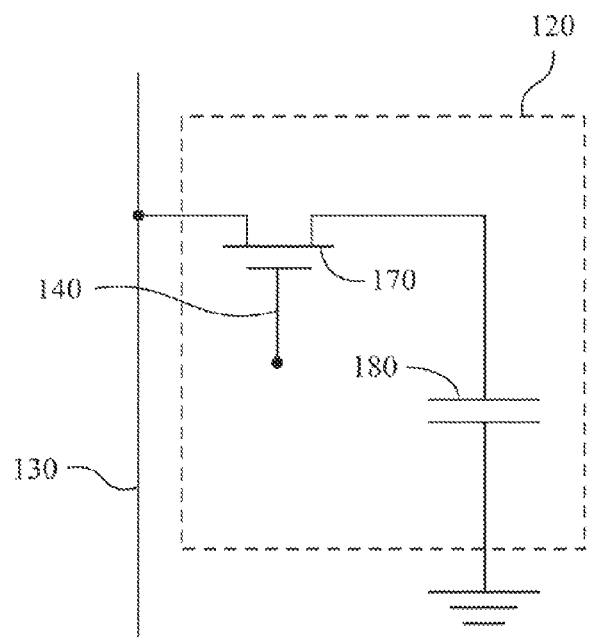
FIG. 2 illustrates a circuit diagram according to pixels in an embodiment of the present invention.

FIG. 2 illustrates a circuit diagram drawn according to pixels 120 in an embodiment of the present invention. In this embodiment, each of the pixels 120 includes a bi-stable metal oxide transistor 170 and a display unit 180 which are connected with each other.

In structure, the first source/drain electrode of the bi-stable metal oxide transistor 170 is connected to the data lines 130; the second source/drain electrode of the bi-stable metal oxide transistor 170 is connected with the first end of the display unit 180, and the gate electrode of the bi-stable metal oxide transistor 170 is connected to the gate lines 140. The second end of the display unit 180 is grounded.

In operation, the metal oxide semiconductor layer of the bi-stable metal oxide transistor 170 generates a great quantity of free electrons after being illuminated by light rays, so that the critical voltage is reduced significantly and is switched to another stable state. Thus the bi-stable metal oxide transistor 170 has a first stable state after illumination and a second stable state before illumination, and the critical voltage of the bi-stable metal oxide transistor 170 in the first stable state is far lower than the critical voltage of the bi-stable metal oxide transistor 170 in the second stable state. The display unit 180 has a first display state and a second display state, i.e., the first display state and the second display state of the pixels 120.

In realization, indium-gallium-zinc oxide, zinc oxide and the like metal oxides are adopted for the semiconductor layer of the bi-stable metal oxide transistor 170. The display unit 180 may a pure light-emitting element, such as a light-emitting diode; or may be a bi-stable display element, such as an electrophoretic display element or a cholesterol display element. In this embodiment, the display unit 180 is specially realized by adopting a bi-stable electrophoretic display unit and has the advantages of high contrast, short response time and low operation voltage.

Figure 3:
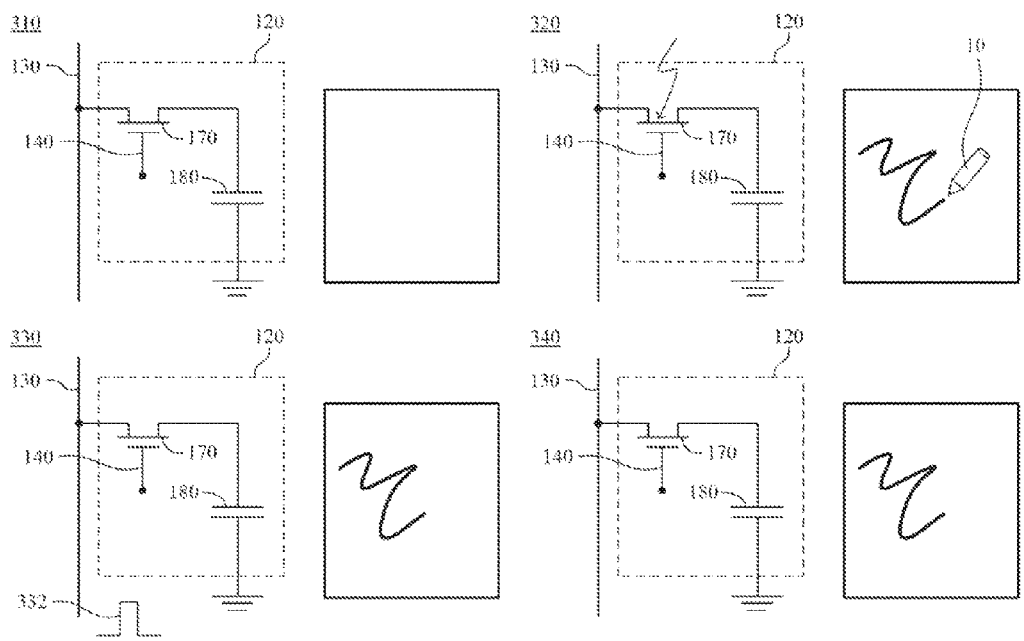
FIG. 3 illustrates a schematic view according to a writing state in an embodiment of the present invention.

FIG. 3 illustrates a schematic view drawn according to a writing state in an embodiment of the present invention, which shows four steps 310-140 in the writing state.

In step 310, assuming that initially all display units 180 in the display panel 110 are of the second display state, such as being white. The data driving circuit 150 provides a first data voltage to all the bi-stable metal oxide transistors 170 via the data lines 130, and the gate driving circuit 160 provides a first gate voltage to all the bi-stable metal oxide transistors 170 via the gate lines 140. At this time, the bi-stable metal oxide transistor 170 is not conducted by the first gate voltage, and therefore, the first data voltage is not provided to the display unit 180. The first data voltage is used for enabling the display unit 180 to be switched from the second display state to the first display state, such as being switched from white to black. For example, the first data voltage is 20 V. The illuminated bi-stable metal oxide transistors 170 are conducted by the first gate voltage after the first data voltage is applied to the bi-stable metal oxide transistors 170, but the bi-stable metal oxide transistors 170 before illumination are not conducted. For example, the first gate voltage is 0-20 V. It should be noticed that all the above voltage values can be adjusted according to practical application and are not limited to this embodiment.

In step 320, a light pen 10 is utilized to emit a light ray onto the display panel 110 for writing, and thus the bi-stable metal oxide transistors 170 illuminated by the light rays are switched to or kept in a first stable state after illumination. When being of the first stable state, the bi-stable metal oxide transistors 170 is conducted by the first gate voltage, and the display unit 180 connected to the conducted bi-stable metal oxide transistors 170 receives the first data voltage. The display unit 180 is further switched to or kept in a first display state, such as being black. The light pen 10 emits light rays so as to blacken partial pixels 120, as that a trace is written on the display panel 110 by the light pen 10.

Step 330 is used for keeping the written trace after writing. When the display unit 180 is switched to the first display state, the gate driving circuit 160 provides voltage pulse waves to all the bi-stable metal oxide transistors 170 via the gate lines 140, so that the bi-stable metal oxide transistors 170 receive the voltage pulse waves 332, and is switched to or kept in a second stable state. The bi-stable metal oxide transistors 170 are cutoff and are not conducted anymore, so as to kept in the first display state of the pixels 120 illuminated by the light rays. It should be noticed that the voltage pulse waves 332 are used for enabling the bi-stable metal oxide transistors 170 to be switched from the first stable state to the second stable state. The voltage for example is, but not limited to 40 V.

Step 340 is the state that the writing is ended. At this time, the trace written by the light pen 10 on the display panel 110 is kept, and the first data voltage or the first gate voltage does not need to be provided to the pixels 120 anymore.

Figure 4:
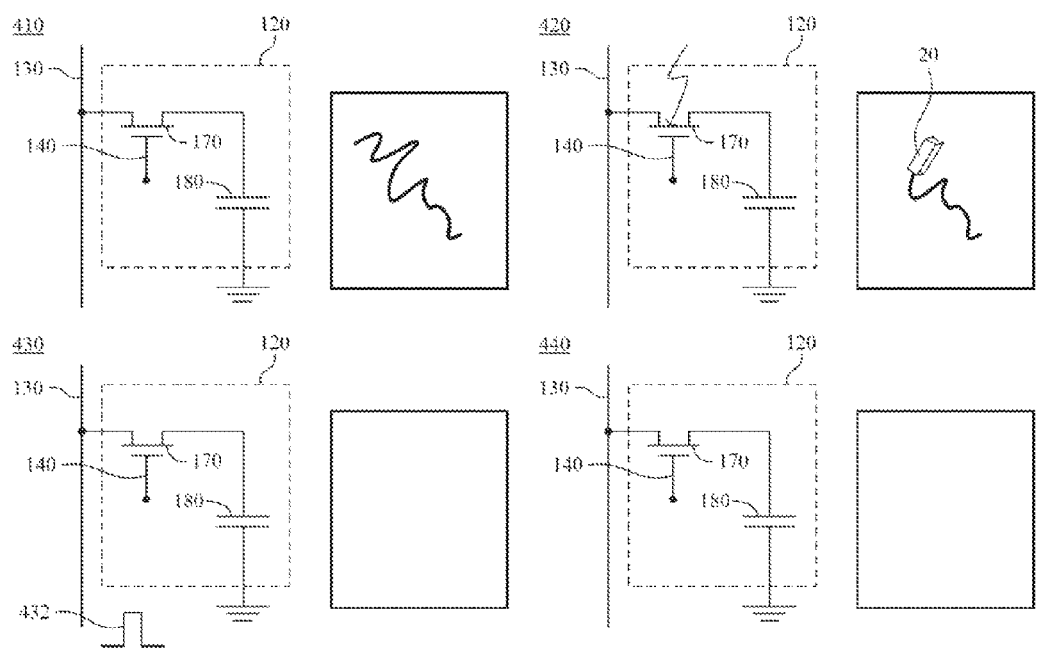
FIG. 4 illustrates a schematic view according to an erasing state in an embodiment of the present invention.

FIG. 4 illustrates a schematic view drawn according to an erasing state in an embodiment of the present invention, which shows four steps 410-440 in the erasing state.

In step 410, assuming that initially partial display units 180 are of the first display state, such as being black, and the rest display units 180 are of the second display state, such as being white. The data driving circuit 150 provides a second data voltage to all the display units 180 via data lines 130, and the gate driving circuit 160 provides a second gate voltage to all the display units 180 via the gate lines 140. At this time, the bi-stable metal oxide transistors 170 are not conducted by the second gate voltage, and thus the second data voltage is not provided to the display units 180. The second data voltage is used for enabling the display units 180 to be switched from the first display state to the second display state, such as being switched from black to white. For example, the second data voltage is −20 V. The illuminated bi-stable metal oxide transistors 170 are conducted by the second gate voltage after the second data voltage is applied to the bi-stable metal oxide transistors 170, but the bi-stable metal oxide transistors 170 before illumination are not conducted. The first gate voltage for example is 0-20 V. It should be noticed that all the above voltage values can be adjusted according to practical application and are not limited to this embodiment.

In step 420, an eraser 20 is utilized to emit light rays onto the display panel 110, and thus the illuminated bi-stable metal oxide transistors 170 illuminated by the light ray are switched to or kept in a first stable state after illumination. When the bi-stable metal oxide transistors 170 are of the first stable state, the bi-stable metal oxide transistors 170 are conducted by the second gate voltage, and the display unit 180 connected to the conducted bi-stable metal oxide transistors 170 receives a second data voltage. The display unit 180 is further switched to or kept in a second display state, such as being white. Therefore, the eraser 20 emits light rays to enable partial pixels 120 to be changed into white, as that the eraser 20 removes the trace from the display panel.

Step 430 keeps the second display state of the pixels 120 after erasing. When the display unit 180 is switched to the second display state, the gate driving circuit 160 provides voltage pulse waves 432 to all the bi-stable metal oxide transistors 170 via gate lines 140, so that the bi-stable metal oxide transistors 170 receive the voltage pulse waves, and is switched to or kept in a second stable state, and the bi-stable metal oxide transistors 170 are cutoff and are not conducted anymore, so as to keep the second display state of pixels 120 illuminated by the light rays. It should be noticed that the voltage pulse waves 432 are used for enabling the bi-stable metal oxide transistors 170 to be switched from the first stable state to the second stable state. The voltage for example is, but not limited to 40 V.

Step 440 is the state that the erasing is ended. At this time, the second display state of the pixels 120 after erasing is kept, and the second data voltage or the second gate voltage does not need to be provided to the pixels 120.

Figure 5:
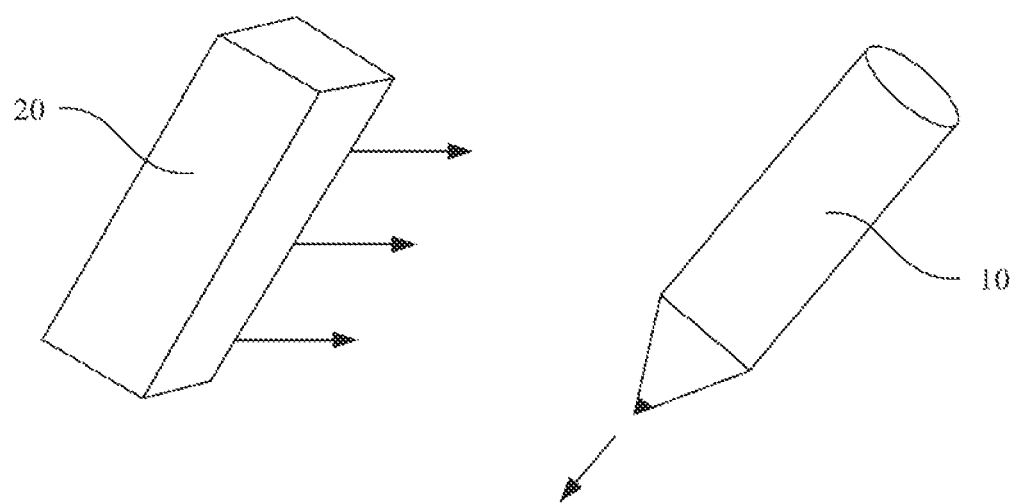
FIG. 5 illustrates a schematic view according to a light pen and an eraser in an embodiment of the present invention.

The light pen 10 and the eraser 20 mentioned in the above paragraphs are light-emitting apparatuses and can emit light rays. The light ray emitting area of the eraser 20 is larger than that of the light pen 10 so as to facilitate erasing, as shown in FIG. 5. It should be noticed that energy carried by light rays emitted by the light pen 10 and the eraser 20 are required to stimulate electrons of a metal oxide semiconductor layer. In an embodiment, since the work function of general metal is above 2.8 eV, energy carried by the light rays should be greater than 2.8 eV, and the wavelength is required to be smaller than 443 nm. The light ray can be a near ultraviolet ray with the wavelength between 300 nm and 400 nm, and it is required not to damage elements of the light sensitive display apparatus 100. The wavelength is determined according to practical application.

In addition, in this embodiment, since signals on all the data lines 130 are identical, the data lines 130 are connected with each other to simplify the circuit. Furthermore, signals on all the gate lines 140 are also identical, so that the gate lines 140 are also connected with each other to simplify the circuit. It should be noticed that in other embodiments, signals carried by the above data lines 130 or the gate lines 140 may be not identical, and the data lines 130 or the gate lines 140 may be not connected with each other. Therefore, the connection relationship is not limited to this embodiment.

In sum, the light sensitive display apparatus 100 provided by the embodiment of the present invention has a writing state and an erasing state, and the operating method includes the following steps.

(a) In the writing state, the data driving circuit 150 provides a first data voltage to all the pixels 120 via data lines 130, and the gate driving circuit 160 provides a first gate voltage to all the pixels 120 via gate lines 140, so that the pixels 120 illuminated by the light rays are switched to or kept in a first display state. In addition, after the pixels 120 illuminated by the light rays are switched to or kept in a first display state, the gate driving circuit 160 provides voltage pulse waves to the pixels 120 via the gate lines 140 so as to keep the first display state of the pixels 120 illuminated by the light rays.

(b) In the erasing state, the data driving circuit 150 provides a second data voltage to all the pixels 120 via data lines 130, and the gate driving circuit 160 provides a second gate voltage to all the pixels 120 via gate lines 140, so that the pixels 120 illuminated by the light rays are switched to or keep a second display state. In addition, after the pixels 120 illuminated by the light ray are switched to or keep a second display state, the gate driving circuit 160 provides voltage pulse waves to the pixels 120 via gate lines 140, so as to kept in the second display state of the pixels 120 illuminated by the light ray.

With the above display apparatus and the operating method thereof, a light sensitive display apparatus which has light writing property and can utilize light rays to write or erase is realized. This light sensitive display apparatus is greatly different from traditional touch panels in structure and operation. The light sensitive display apparatus does not need to detect a touch position and can directly change the display state of the pixels via illumination. Therefore, the light sensitive display apparatus avoids complicated configuration of traditional touch panels and avoids the disadvantages that the touch panel is easily interfered and poorly positioned. In addition, the light sensitive display apparatus further has the characteristics of low energy consumption and the capability of keeping the picture permanently. The light sensitive display apparatus is thus applied to display apparatuses having a writing function, such as an electronic blackboard or electronic paper apparatus.

Although the present invention has been disclosed with reference to the above embodiments, the embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A light sensitive display apparatus, comprising:
a display panel comprising a plurality of pixels, and each of the pixels comprising a transistor;
a plurality of data lines connected to the pixels;
a plurality of gate lines connected to the pixels;
a data driving circuit connected to the data lines, wherein in a writing state the data driving circuit provides a first data voltage to the pixels via the data lines, and in an erasing state the data driving circuit provides a second data voltage to the pixels via the data lines; and
a gate driving circuit connected to the gate lines, wherein in the writing state the gate driving circuit provides a first gate voltage to the pixels via the gate lines, and in the erasing state the gate driving circuit provides a second gate voltage to the pixels via the gate lines,
wherein, in the writing state, the pixels illuminated by light rays are switched to kept in a first display state, and
in the erasing state, the pixels illuminated by the light rays are switched to or kept in a second display state;
wherein each of the pixels comprises a bi-stable metal oxide transistor, one of the gate lines and one of the data lines cooperate to apply a first gate-to-source voltage to one of the bi-stable metal oxide transistors in the writing state, each of the bi-stable metal oxide transistors has a first threshold voltage after illumination and a second threshold voltage before illumination, the first threshold voltage is lower than the second threshold voltage, the first gate-to-source voltage is determined in a range between the first threshold voltage and the second threshold voltage, so as to conduct the bi-stable metal oxide transistor after illumination and to not conduct the bi-stable metal oxide transistor before illumination.

2. The light sensitive display apparatus of claim 1, wherein in the writing state, after the pixels illuminated by the light rays are switched to or kept in the first display state, the gate driving circuit provides a voltage pulse wave to the pixels via the gate lines, so as to keep the first display state of the pixels illuminated by the light rays.

3. The light sensitive display apparatus of claim 2, wherein each of the pixels further comprises a display unit connected with each other, and each display unit has the first display state and the second display state;

in the writing state, the bi-stable metal oxide transistor illuminated by the light rays is switched to or kept in a first stable state and is conducted by the first gate voltage, and the display unit connected with the conducted bi-stable metal oxide transistor receives the first data voltage, such that the display unit is further switched to the first display state; when the display unit is switched to the first display state, the bi-stable metal oxide transistors receives the voltage pulse wave and are switched to or kept in a second stable state, and the bi-stable metal oxide transistors are cutoff.

4. The light sensitive display apparatus of claim 1, wherein in the erasing state, after the pixels illuminated by light rays are switched to or kept in the second display state, the gate driving circuit provides a voltage pulse wave to the pixels via the gate lines, so as to keep the second display state of the pixel illuminated by the light rays.

5. The light sensitive display apparatus of claim 4, wherein each of the pixels further comprises a display unit which are connected with each other, and each display unit has the first display state and the second display state; and in the erasing state, the bi-stable metal oxide transistor illuminated by the light rays is switched to or kept in a first stable state and is conducted by the second gate voltage; the display unit connected with the conducted bi-stable metal oxide transistor receives the second data voltage, such that the display unit is further switched to the second display state; when the display unit is switched to the second display state, the bi-stable metal oxide transistors receive the voltage pulse wave and are switched to or kept in a second stable state, and the bi-stable metal oxide transistors are cutoff.

6. The light sensitive display apparatus of claim 1, wherein the display panel is a bi-stable electrophoretic display panel.

7. An operating method of a light sensitive display apparatus, wherein the light sensitive display apparatus comprises a display panel, the display panel comprises a plurality of pixels, a plurality of gate lines and a plurality of data lines, and each of the pixels comprises a bi-stable metal oxide transistor, and the operating method comprises:

in a writing state, providing a first data voltage and a first gate voltage to the pixels, so that the pixel illuminated by light rays is switched to or kept in a first display state; and in an erasing state, providing a second data voltage and a second gate voltage to the pixels, so that the pixel illuminated by light rays is switched to or kept in a second display state;

wherein one of the gate lines and one of the data lines cooperate to apply a first gate-to-source voltage to one of the bi-stable metal oxide transistors in the writing state, each of the bi-stable metal oxide transistors has a first threshold voltage after illumination and a second threshold voltage before illumination, the first threshold voltage is lower than the second threshold voltage, the first gate-to-source voltage is determined in a range between the first threshold voltage and the second threshold voltage, so as to conduct the bi-stable metal oxide transistor after illumination and to not conduct the bi-stable metal oxide transistor before illumination.

8. The operating method of the light sensitive display apparatus of claim 7, wherein the step in the writing state further comprises:

providing a voltage pulse wave to the pixels, so as to keep the first display state of the pixel illuminated by the light rays.

9. The operating method of the light sensitive display apparatus of claim 8, wherein each of the pixels further comprises a display unit which are connected with each other, each display unit has the first display state and the second display state, and the step in the writing state further comprises:

providing the first data voltage and the first gate voltage to the bi-stable metal oxide transistors so that the bi-stable metal oxide transistor illuminated by light rays is switched to or kept in a first stable state and is conducted by the first gate voltage, the display unit connected with the conducted bi-stable metal oxide transistor receives the first data voltage, such that the display unit is further switched to or kept in the first display state; and providing a voltage pulse wave to the bi-stable metal oxide transistors, so that the bi-stable metal oxide transistors are switched to or kept in a second stable state, and the bi-stable metal oxide transistors are cutoff.

10. The operating method of the light sensitive display apparatus of claim 7, wherein the step in the erasing state further comprises:

providing a voltage pulse wave to the pixels, so as to keep the second display state of the pixel illuminated by light rays.

11. The operating method of the light sensitive display apparatus of claim 10, wherein each of the pixels further comprises a display unit which are connected with each other, and each display unit has the first display state and the second display state, and the step in the erasing state further comprises:

providing the second data voltage and the second gate voltage to the bi-stable metal oxide transistors, so that the bi-stable metal oxide transistor illuminated by light rays is switched to or kept in a first stable state and is conducted by the second gate voltage, such that the display unit connected with the conducted bi-stable metal oxide transistor receives the second data voltage, and the display unit is further switched to or kept in the second state; and providing the voltage pulse wave to the bi-stable metal oxide transistors, so that the bi-stable metal oxide transistors are switched to or kept in a second stable state, and the bi-stable metal oxide transistors are cutoff.

* * * * *